(12) United States Patent
Graham (10) Patent No.: US 10,037,538 B2
(45) Date of Patent: Jul. 31, 2018

(54) SELECTION AND PRESENTATION OF NEWS STORIES IDENTIFYING EXTERNAL CONTENT TO SOCIAL NETWORKING SYSTEM USERS

(71) Applicant: Facebook, Inc., Menlo Park, CA (US)

(72) Inventor: Adrian A. Graham, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/711,262

(22) Filed: Dec. 11, 2012

(65) Prior Publication Data

US 2014/0164365 A1   Jun. 12, 2014

(51) Int. Cl.
G06F 17/30 (2006.01)
G06Q 30/02 (2012.01)
G06Q 50/00 (2012.01)

(52) U.S. Cl.
CPC ............ *G06Q 30/02* (2013.01); *G06Q 50/01* (2013.01)

(58) Field of Classification Search
CPC ................... G06F 17/30864; G06F 17/30867
USPC ... 707/9, 748, 706, 100, 803, 734, 784, 732, 707/756, 749, 705; 709/203
See application file for complete search history.

(56) References Cited

U.S. PATENT DOCUMENTS

| | | | |
|---|---|---|---|
| 6,460,036 B1 * | 10/2002 | Herz | 707/748 |
| 6,816,858 B1 * | 11/2004 | Coden | G06F 17/30855 386/241 |
| 7,739,304 B2 * | 6/2010 | Naaman et al. | 707/784 |
| 7,831,928 B1 * | 11/2010 | Rose | G06F 17/3089 715/733 |
| 7,870,117 B1 * | 1/2011 | Rennison | G06F 17/3066 707/706 |
| 8,069,179 B2 * | 11/2011 | Chickering | G06F 17/30867 707/723 |
| 8,126,876 B2 * | 2/2012 | Curtiss et al. | 707/721 |
| 8,484,224 B1 * | 7/2013 | Harris et al. | 707/748 |
| 8,662,977 B1 * | 3/2014 | Nicolas | G06Q 40/00 463/1 |
| 8,880,538 B1 * | 11/2014 | Petersson | 707/756 |
| 8,886,625 B1 * | 11/2014 | Dorner | G06F 17/30029 707/705 |
| 8,930,340 B1 * | 1/2015 | Sobol | G06F 17/30864 707/706 |
| 8,972,368 B1 * | 3/2015 | de Sousa | 707/705 |
| 8,996,525 B1 * | 3/2015 | Goldman | G06Q 50/01 705/319 |

(Continued)

*Primary Examiner* — Mariela Reyes
*Assistant Examiner* — Thong Vu
(74) *Attorney, Agent, or Firm* — Fenwick & West LLP (57) ABSTRACT

Social networking system users generate news stories including a link to news content external to the social networking system. The news stories may be filtered based on filter criteria allowing a viewing user to more easily identify news stories of interest. For example, the news stories may be filtered to identify news stories associated with a user connected to the viewing user, to identify news stories associated with a news source, to identify news stories associated with a key word, or based on previous interactions by the viewing user. The identified news stories may be ranked based on popularity of the identified news stories among other users, chronological data, and the viewing user's own interest and activity associated with a news source or news story.

31 Claims, 5 Drawing Sheets

(56) References Cited

U.S. PATENT DOCUMENTS

| | | | |
|---|---|---|---|
| 9,032,289 B1* | 5/2015 | Cierniak | G06F 17/30882 715/230 |
| 2006/0271564 A1* | 11/2006 | Meng Muntz et al. | 707/100 |
| 2006/0288023 A1* | 12/2006 | Szabo | G06F 17/30067 |
| 2007/0043770 A1* | 2/2007 | Goodrich | G06Q 30/00 |
| 2007/0067297 A1* | 3/2007 | Kublickis | 707/9 |
| 2008/0228775 A1* | 9/2008 | Abhyanker et al. | 707/10 |
| 2008/0288494 A1* | 11/2008 | Brogger et al. | 707/7 |
| 2009/0132520 A1* | 5/2009 | Nemeth | G06F 17/30038 |
| 2009/0276459 A1* | 11/2009 | Trout | G06Q 10/10 |
| 2011/0066613 A1* | 3/2011 | Berkman et al. | 707/734 |
| 2011/0208822 A1* | 8/2011 | Rathod | G06Q 30/02 709/206 |
| 2011/0264522 A1* | 10/2011 | Chan | G06Q 30/02 705/14.52 |
| 2011/0264736 A1* | 10/2011 | Zuckerberg | G06Q 30/02 709/204 |
| 2012/0005209 A1* | 1/2012 | Rinearson | G06F 17/30908 707/737 |
| 2012/0016875 A1* | 1/2012 | Jin et al. | 707/734 |
| 2012/0054275 A1* | 3/2012 | Channell | G06Q 30/0278 709/204 |
| 2012/0136852 A1* | 5/2012 | Geller | 707/722 |
| 2012/0290637 A1* | 11/2012 | Perantatos | G06Q 10/10 709/203 |
| 2012/0317203 A1* | 12/2012 | Hostetler | 709/204 |
| 2012/0330938 A1* | 12/2012 | Lee | G06F 17/30699 707/723 |
| 2013/0046797 A1* | 2/2013 | Muntz et al. | 707/803 |
| 2013/0073568 A1* | 3/2013 | Federov et al. | 707/749 |
| 2013/0073971 A1* | 3/2013 | Huang et al. | 715/738 |
| 2013/0073983 A1* | 3/2013 | Rasmussen et al. | 715/753 |
| 2013/0097180 A1* | 4/2013 | Tseng | 707/748 |
| 2013/0198191 A1* | 8/2013 | Hernandez et al. | 707/737 |
| 2013/0204833 A1* | 8/2013 | Pang et al. | 706/52 |
| 2013/0297582 A1* | 11/2013 | Zukovsky et al. | 707/706 |
| 2013/0332523 A1* | 12/2013 | Luu | 709/204 |
| 2014/0019447 A1* | 1/2014 | Goryayskiy et al. | 707/732 |
| 2014/0040281 A1* | 2/2014 | Spivack et al. | 707/748 |
| 2014/0068459 A1* | 3/2014 | Graham | 715/753 |

* cited by examiner

Receive a Request from a Viewing User to View News Stories in a Social Networking System
501

↓

Retrieve User Profile for Viewing User
502

↓

Filter News Stories Based on Filter Criteria
503

↓

Rank Filtered News Stories Based on Ranking Criteria
504

↓

Generate News Feed of News Stories
505

↓

Present News Feed to Viewing User
506

FIG. 5

SELECTION AND PRESENTATION OF NEWS STORIES IDENTIFYING EXTERNAL CONTENT TO SOCIAL NETWORKING SYSTEM USERS

BACKGROUND

This invention relates generally to social networking systems, and more particularly, to presenting news stories to users in a social networking system.

Social networking systems allow their users to share information and interests with each other. Users of the social networking system may share various types of content with other users, such as photos, status messages, comments, events, or links. Shared content may include links from external sources, such as third party web pages including articles, news stories, commentaries, photos, and the like. For example, a user may post an external link or content about a news story on a news feed, post a link on a user profile page, or send a link to a group of users in the social networking system. Viewing users or users that are connected to the posting user ("connected users") in the social networking system may click on, comment on, like, share, or otherwise interact with the posted link the post.

Social networking system users increasingly learn about interesting or breaking news stories, as well as trending articles or topics in the news, from links to news stories shared by other social networking system users. A popular or trending news topic may be shared with a viewing user in the social networking system before the viewing user hears or reads about the story on a television broadcast, a news website, or via other media. In addition, users prefer to view news stories relevant to their personal interests or to view news stories interesting to social networking system users connected to them or having similar interests. However, conventional social networking systems do not allow a user to readily identify news stories of interest to the user.

SUMMARY

A social networking system displays news stories shared by users in a news feed presented to users connected to the user sharing the news story. A shared news story may include a link to content published on web pages external to the social networking system. Users of the social networking system may access the content published on the web pages external to the social networking system by accessing the link included in a news story; additionally, users may perform other interactions with the news story (e.g., express a preference for the news story, comment on the news story, share the news story). The social networking system also maintains pages for third party entities, such as news sources and news-affiliated businesses, and allows users to connect to and express a preference for ("like") a page associated with a news source.

To improve user interactions with news stories, the social networking system may provide a viewing user with news stories filtered based on one or more criteria. For example, the social networking system filters news stories presented to a viewing user based on data about the viewing user's interests, actions associated with news stories or news sources, connections to other users, or any other suitable criteria. In one embodiment, the social networking system filters the news stories to identify news stories associated with users connected to the viewing user. In another example, the social networking system filters news stories to identify news stories associated with content with which the user previously interacted. Similarity of content among news stories may be assessed and used to filter news stories. For example, similarity of content between news stories may be based on key words, content types, or tagged content in the news stories.

One or more ranking criteria may also be applied to rank news stories. For example, the news stories are scored and ranked based on their scores. In one embodiment, news stories may be ranked based on the popularity of the news story among users of the social networking system. Popularity may be based on the number of views, likes, comments, shares, or individual posts of the news story in the social networking system. In another embodiment, news stories may be ranked based on chronological data associated with interactions with the news stories, so that the most recently shared news stories have a higher ranking. Alternatively, news stories are ranked based on the viewing user's interests and past actions in the social networking system. In particular, the social networking system may rank based on the viewing user's interests and past actions associated with news stories or news sources. In one embodiment, the viewing user's past interactions with users associated with various news stories (e.g., a user sharing the link included in the news story) are used to rank the news story. The social networking system may display the news stories to the viewing user in an order that is determined at least in part on the ranking. The ranking may be performed after the news stories have been filtered using the one or more filter criteria.

The filtered and ranked news stories are presented to viewing users via a news feed or a news story page maintained by the social networking system. Viewing users may select viewing filters for the presented news stories. Examples of viewing filters include viewing all news stories shared in the social networking system, viewing news stories associated with a particular news source, or viewing news stories associated with users connected to the viewing user. These viewing filters may be further sorted based on the popularity of the news story, chronological data, the viewing user's interests, and/or the viewing user's actions associated with the news story or news source.

In one embodiment, the social networking system may also provide a recommendation to the viewing user for additional news sources in which the viewing user may have an interest. The recommendation may be based on the viewing user's interests in other news sources or on the viewing user's interactions with previous news stories or news sources. The viewing user may accept the recommendation to add the recommended news source to its interests maintained by the social networking system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system allows users to communicate and interact with other users. Users join the social networking system and add connections to other users. Each user has a user profile associated with user information describing the user. For example, a user profile includes information about the user's age, gender, geographic location, education history, work history, and the like. Additionally, may express interest in a variety of topics through the social networking system. Examples of topics in which a user may express an interest include: products, companies, businesses, celebrities, television shows, books, hobbies, sports teams, music, and the like. A user may express interest by expressing a preference or content item associated with a topic ("liking" the page or content item) or by joining a group dedicated to a topic of interest in the social networking system. Interests of the user may also be inferred by actions performed in the social networking system, such as posting content, tagged photos, or status updates about a particular topic of interest.

Users may share information that may be interesting or relevant to other users, such as interests, news, links to web pages, products, comments, photos, videos, or multimedia. Often, users share links to external web pages with other social networking system users. The links may direct social networking system users to content of interest, such as news articles or news stories. For example, a shared link to an external web page may allow retrieval of content for breaking news or trending topics from the external web page.

Users of a social networking system may also include entities, such as businesses, manufacturers of goods, retailers, corporations, organizations, communities, groups, or other non-individuals. An entity may create and maintain an entity page in the social networking system. The entity page includes information associated with the entity, allowing users to obtain information about the entity via the brand page. Users may connect to the entity page to receive updates or information about the entity or products provided by the entity. Additionally, users may express an interest in the entity by interacting with the entity page. For example, users may express a preference for, comment on, or post content about the entity on their user profiles or on the entity page.

In some embodiments, an entity may be a news source external to the social networking system. As used herein, "news source" refers to a news-affiliated entity or an online news provider providing news content. For example, a news source may be a news broadcasting company or a newspaper company. The news source may be associated with a web site having various web pages, a television program, an online or printed newspaper, an online journal, an online blog, or other information-delivery medium. Examples of news sources include news broadcasting companies, news web sites, newspaper publishers and/or and their affiliated web sites. The web pages associated with a news source may include news stories, articles, short news features (summaries, excerpts, etc.), photos, live video streaming, audio packages, commentaries, blogs, interactive multimedia, searchable archives of news features, background information, and the like.

A news source may be associated with one or more pages in the social networking system associated with the news source and/or news stories. Users may express an interest in the news source by interacting with the associated page (e.g., a user may "like" a page for The New York Times). The news source page may also allow users to submit commentary and opinions about news stories presented by the news source, enhancing the quality and experience of sharing news and information in the social networking system.

As used herein, "shared links" or "links" refer to hyperlinks, or other network addresses, posted by users of the social networking system and providing a reference to data. A user may manually access a link to retrieve content or the content may be automatically retrieved from a source identified by the link, such as a web page external to the social networking system. The hyperlink may identify a web page, a portion of a web page, or a specific element or text within a web page. The links may be stored in the social networking system as uniform resource locators (URLs). In one embodiment, a news story posted by a social networking system includes a link to news content maintained by a news source or other entity external to the social networking system. The news stories including links to news content may be included as stories in a news feed presented to a viewing user or may be presented by a separate story page maintained by the social networking system.

Figure 1:
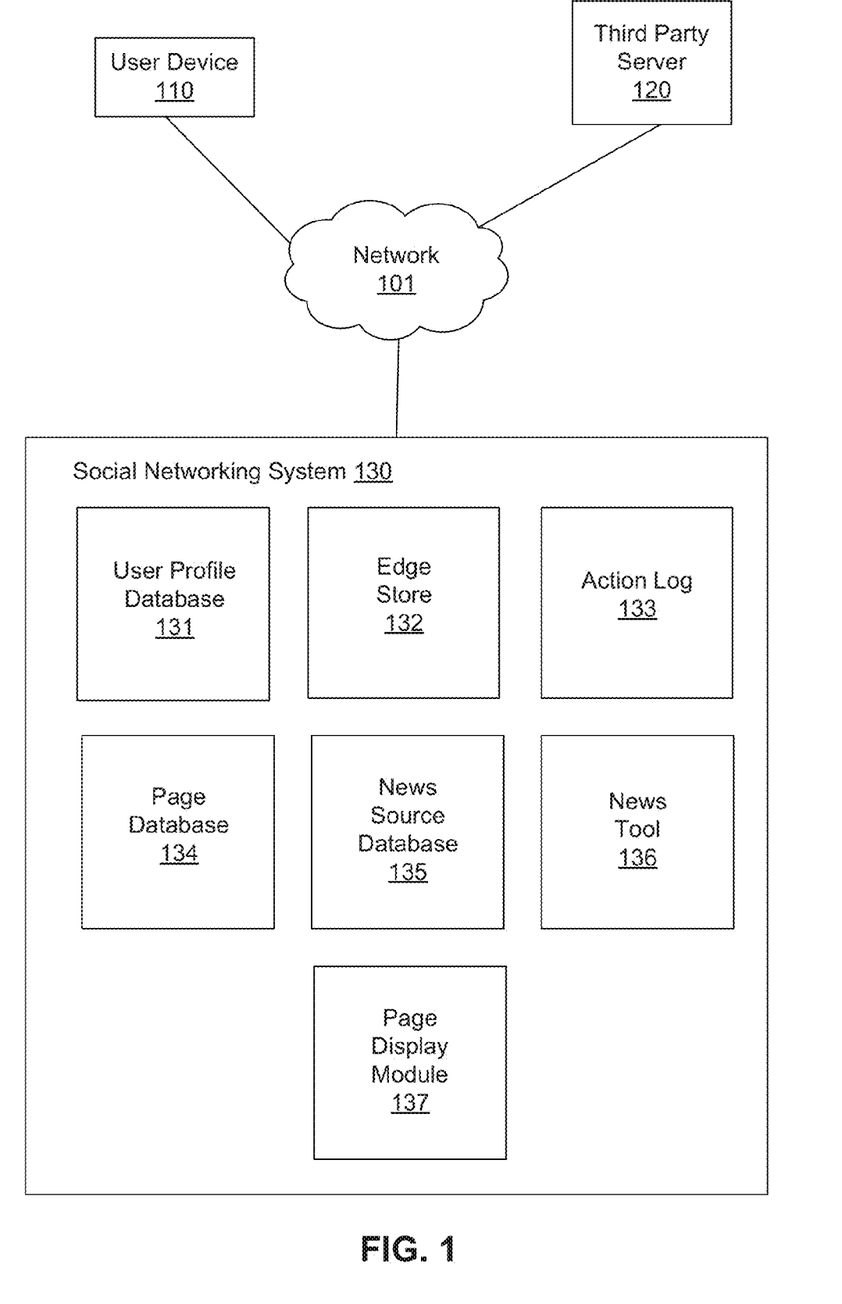
FIG. 1 is a block diagram of a system environment, in accordance with an embodiment of the invention.

FIG. 1 is a block diagram of a system environment 100 in which a social networking system 130 operates. The system environment 100 comprises a network 101, a user device 110, a third party server 120, and a social networking system 130. In alternative configurations, different and/or additional components may be included in the system environment 100. Additionally, the embodiments described herein may be adapted to online systems that are not social networking systems.

The network 101 is a communication pathway for one or more user devices 110, the third party server 120, and/or the social networking system 130. The network 101 may comprise any combination of local area and/or wide area networks using wireless and/or wired communication systems. For example, the network 101 may include the Internet, as well as mobile telephone networks. In one embodiment, the network 101 uses standard communications technologies and/or protocols. Hence, the network 101 may include communication links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 101 may include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 101 may be represented using technologies and/or formats including image data in binary form (e.g. Portable Network Graphics (PNG)), the hypertext markup language (HTML), the extensible markup language (XML), etc. In addition, all or some of the communication links may be encrypted using conventional encryption technologies such as secure sockets layer (SSL), transport layer security (TLS), virtual private networks (VPNs), Internet Protocol security (IPsec), etc. In another embodiment, the entities exchanging data via the network 101 may use custom and/or dedicated data communications technologies instead of, or in addition to, the ones described above.

The user device 110 may be a desktop computer, laptop computer, portable computer, smart phone, personal digital assistant (PDAs) or any other device including computing functionality and data communication capabilities. The user device 110 is configured to communicate with the social networking system 130 or the third party server 120 via the network 101. In one embodiment, the user device 110 executes an application allowing the user of the user device 110 to interact with the social networking system 130 and/or the third party server 120.

The third party server 120 is an external server and may be associated with a third party entity, such as a news source, a business entity, a company, a corporation or an organization. The third party server 120 may store data for one or more third party web pages and may provide data about the stored web pages to the social networking system 130. For example, when a user shares a link to a web page maintained by the third party server 120, the third party server 120 transmits stored data to the social networking system 130 describing the web page associated with the shared link. Examples of the stored data transmitted to the social networking system 130 include: one or more photos, a text description, or a summary or excerpt about the content on the web page. The link to the web page maintained by the third party server 120 may be displayed in the social networking system 130 in association with data about the content on the linked web page, such as a photo or description about the content.

In some embodiments, a web page presented via the third party server 120 (a "third party web page") uses an application programming interface (API) to retrieve a user's information from the social networking system 130 and/or for communicating information to the social networking system 130. For example, the third party web page includes instructions that, when executed by the user device 110, retrieve data from the social networking system 130 or transmit data to the social networking system 130. In various embodiments, the instructions comprise a widget, a social plug-in, programmable logic, or code snippet. The instructions may generate a frame within the third party web page, such as an iframe, including information from the social networking system 130. For example, execution of the instructions in the third party web page by the user device 110 generates a frame within the third party web page that includes an action button allowing a user to interact with data stored in the social networking system. In one example, when a user visits the third party web page, a "share" button is included in a frame within the third party web page that allows a user to share a link to the third party web page via the social networking system 130. Exchange of information between a social networking system 130 and web pages provided by a third party server 120 is further described in U.S. patent application Ser. No. 12/764,929, filed on Apr. 21, 2010, which is incorporated by reference herein in its entirety.

In other embodiments, execution of the instructions in the third party web page retrieves information about the user's identity from the user device 110 when third party web page is rendered. Execution of the instructions may retrieve information about the identity of the user from the social networking system 130. This allows the user's actions on the third party web page (e.g., sharing a link to the third party web page) to be communicated to the social networking system 130 and associated with the identified user. In one embodiment, the user's actions on the third party web page (e.g., sharing a link to the third party web page) are sent directly to the social networking system 130, so the third party server 120 does not receive or store data about the identity of the user. This maintains the privacy of the user and his actions on the third party web page. Providing content from the social networking system 130 to a web page provided by a third party server 120 is further described in U.S. Pat. No. 8,250,145, filed on Apr. 21, 2010, which is incorporated by reference herein in its entirety.

The social networking system 130 comprises a user profile database 131, an edge store 132, an action log 133, a page database 134, a news source database 135, a news tool 136, and a page display module 137. In other embodiments, the social networking system 130 may include additional, fewer, or different components for various applications. Conventional components such as network interfaces, security functions, load balancers, failover servers, management and network operations consoles, and the like are not shown so as to not obscure the details of the system architecture.

Each user of the social networking system 130 is associated with a user profile, which is stored in the user profile database 131. A user profile includes information about a user that is explicitly provided by the user and may include information inferred by the social networking system 130. In one embodiment, a user profile includes multiple data fields, each data field describing one or more attributes of the user. The user profile information stored in the user profile database 131 may include biographic, demographic, geographic, and other types of descriptive information about the user, such as age, gender, location, hobbies, preferences, interests, work experience, educational history, and the like. Additionally, a user profile may be associated with a username, a password, an identification number, one or more verified Internet Protocol (IP) addresses, or other identifying information. Other examples of identifying information include an email address, a date of birth, location information, or user-specific questions and answers.

The user profile database 131 may also store content items associated with the user profile, such as images, photos, text, and multimedia content, such as videos or audio files. A user profile in the user profile database 131 may also maintain references to actions by the corresponding user performed on content items and stored in the action log 133. The user profile database 131 stores data about posts, comments, status updates, images, links, multimedia, video, or other content that is displayed on the user profile. In some embodiments, the user profile is associated with one or more objects (e.g., pages_ in the social networking system 130 in which a user corresponding to the user profile has expressed an interest. These pages may be associated with a news source, a business, a product, a brand, a celebrity, an entertainment figure or source, a group or organization, a sports team, or a topic of interest. In some embodiments, the user profile page is associated with one or more preferred news sources in which a corresponding user has expressed an interest.

The edge store 132 stores data about edges, which are connections between users, between objects and/or between users and objects (e.g., pages) in the social networking system 130. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 130, such as expressing interest in a page on the social networking system, sharing a link with other users of the social networking system, and commenting on posts made by other users of the social networking system 130.

The edge store 132 may also store affinity scores for objects, interests, pages, and other users. Affinity scores can be computed by the social networking system 130 over time to approximate a user's affinity for an object, an interest, or another user based on the actions performed by the user. A user's affinity may be computed by the social networking system 130 over time to approximate a user's affinity for an object, an interest, or another user in the social networking system 140 based on the actions performed by the user. Computation of affinity is further described in U.S. patent application Ser. No. 12/978,265, filed on Dec. 23, 2010, which is hereby incorporated by reference in its entirety. For example, if a user likes a page about Cyclocross bikes and posts frequently about biking, the social networking system 130 may determine that the user has a high affinity for bikes or biking and can calculate an affinity score accordingly. The affinity score can be stored in the edge store 132 in association with the edge and/or the user.

The action log 133 stores information about the actions by users in the social networking system 130 as well as actions by users on websites external to the social networking system, such as the third party server 120. Such actions can include liking or commenting on a post, uploading an image or link, sending or reading a message, clicking on a link or image, viewing content associated with another user, adding content to another user's page, among others. The action log 133 stores actions between a user and a user profile of an entity (i.e., an entity page) within the social networking system 130, or between a user and an object on an entity page or other user profile. Each interaction between a user and an object in the social networking system 130 stored in the action log 133 may include an identifier of the user performing the interaction and an identifier of the object involved in the interaction. In some embodiments, data from the action log 133 is used to infer interests or preferences of the user, augmenting the interests included in the user profile and allowing a more complete understanding of user preferences.

The action log 133 may also store user actions taken on external websites, such as third party server 120. For example, a third party news web site may recognize a user of a social networking system 130 through a social plug-ins that enables the news web site to identify the user of the social networking system 130. Because users of the social networking system 130 are uniquely identifiable, third party entities may use the information about these users as the users visit their web sites. The action log 133 records data about these users, including web page viewing histories, advertisements that were engaged, purchases made, and other patterns from viewing and clicking on links. These actions are associated with the user profile or the user's identifying information in the action log 133.

Hence, the user profile store 131, the edge store 132, and the action log 133 allow the social networking system 130 to generate a social graph with nodes connected by edges. Nodes include users and objects of the social networking system 130, such as web pages embodying concepts and entities, and the edges connect the nodes. Some edges between users can be defined by real-life relationships. For example, users may generate edges with other users that are labeled as friends, colleagues, acquaintances, close friends, partners, boyfriend and girlfriend, husband and wife, and so forth. Other edges are generated when users interact with objects in the social networking system 130, such as when a user likes a page associated with a news source.

The page database 134 stores data describing the content and layout of pages maintained by the social networking system 130. Examples of information stored by the page database 134 include photos, links, objects, or posts for presentation by page. Additional information stored by the page database 134 includes data about the messages, comments, photos, or other content posted by users on a page. The content may be associated with chronological data, a number of users expressing a preference for the content ("liking" the content), a number of users sharing the content, a total number of comments about the content by other users, or other suitable information.

The page database 134 also includes data about one or more pages associated with news sources ("news source page") in the social networking system 130. Data about the news source page in the social networking system 130 may include the content and topics associated with the news source page (e.g., content and topics associated with the news stories displayed on the page). The page database 134 also stores photos, links, objects, statuses, comments, or other content posted by users on the news source page. Additional data may be associated with the news source page. Examples of additional data include: chronological data for posts associated with the news source page, a number of users that liked the news source page, a number of users sharing content on the news source page, a total number of comments associated with various posts on the news source page, or other suitable information.

The news source database 135 stores data identifying news sources external to the social networking system 130. The data may associate an identifier with a news source with links (e.g., URLs) from the news source, and may also associate information about content provided by the news source with the identifier. In one embodiment, the URLs may be stored as content items in a content store maintained by the social networking system 130. In other embodiments, the news source database 135 stores the links from news sources and data associated with the links. The news source database 135 may also store data about the content or topics presented by the news source through pages external to the social networking system 130. In one embodiment, the news source database 135 may include key words associated with the content or topics provided by the news source. Description about tagging and content extraction in news stories or in association with a news source in the social networking system 130 is provided herein.

When a user posts a news story including a link to news content associated with a news source, the news source database 135 may store the link to the news content in association with the news source. Additional data about the link included in the news story may also be stored. Examples of additional data include the number of views, clicks, shares, likes, or comments associated with the link. In other embodiments, the user profile database 131 and/or the action log 133 may store the link included in the news story in association with the user profile.

The news tool 136 receives and processes requests from viewing users to view news stories via the social networking system 130. As described above, news stories include links to content provided by news sources external to the social networking system. In one embodiment, the news tool 136 identifies news stories associated with users connected to the viewing user. Alternatively, the news tool 136 may identify one or more news stories associated with users that are not associated with users connected to the viewing user. The news tool 136 receives data associated with news stories and selects news stories for presentation to the viewing user.

Generally, the news tool 136 filters, ranks and/or extracts content from news stories for presentation to a viewing user. The news tool 136 is further described below in conjunction with FIG. 2.

In some embodiments, the news tool 136 receives instructions from a viewing user for filtering and/or ranking news stories. In other embodiments, the news tool 136 selects rules for filtering and/or ranking news stories. For example, the news tool 136 may filter news stories based on a content or a topic associated with the news stories, based on the news source associated with the news stories, based on users associated with the news stories or based on the preferred news sources of the viewing user. In addition, the news tool 136 ranks the news stories according to one or more criteria. The ranking may occur after the filtering of the news stories. In one embodiment, news stories are scored based on one or more criteria and ranked. The ranking may determine the order in which news stories are presented to the viewing user. For example, the news stories having a higher ranking are first presented to the viewing user. Filtering and ranking by the news tool 136 are described in further detail with respect to FIG. 2.

The page display module 137 displays the news stories to a viewing user in the social networking system 130. For example, the page display module 137 receives the filtered and/or ranked news stories from the news tool and displays the received news stories. In some embodiments, the page display module 137 displays the link to an external web page included in a news story proximate to a photo and a description of the news story. The displayed news story may also be associated with one or more inputs, allowing the viewing user to interact with the news story. For example, the displayed news story includes "like" button that allows the viewing user to indicate a preference for the news story. As another example, the displayed news story includes a section for receiving comments from the viewing user, and may also display comments previously received from other social networking system users proximate to the news story.

News stories may be displayed chronologically, displayed based on the popularity of the news story as described herein (e.g., "top posts," posts with the most views, comments, likes, or shares), or based on any other suitable criteria. The news stories may displayed on a news feed page including additional stories unrelated to news. In another embodiment, the news stories are displayed on a separate news story page in the social networking system 130. News stories may be filtered based on viewing options selected by the viewing user, as further described below.

Figure 2:
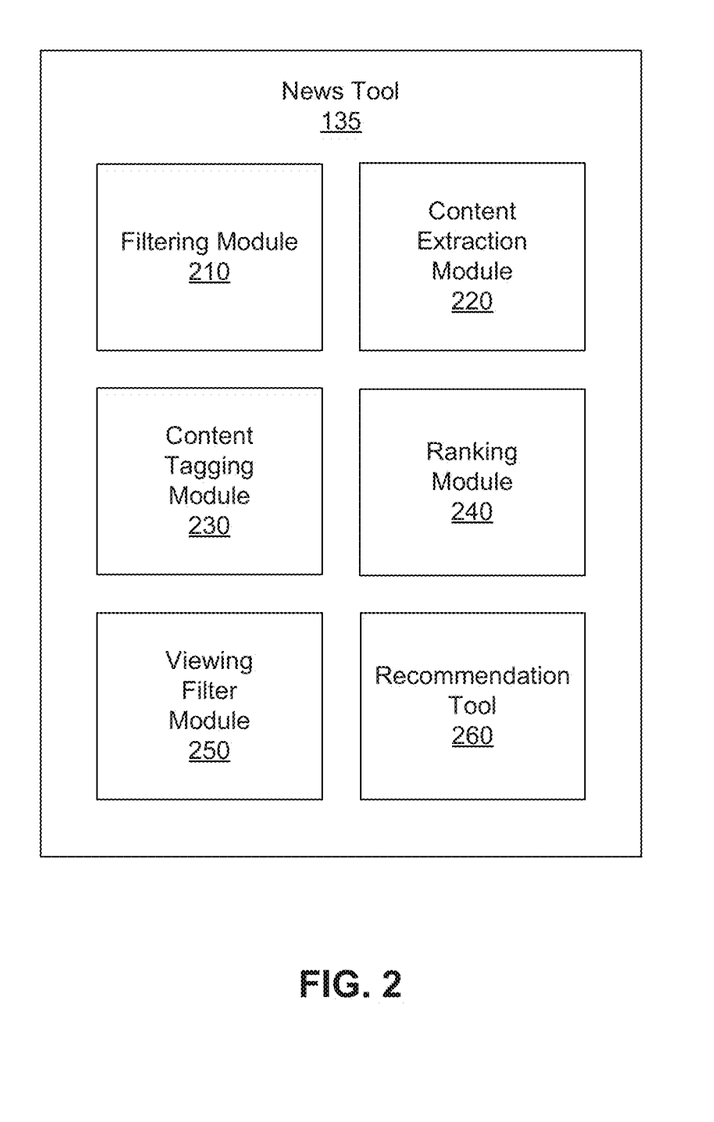
FIG. 2 is a block diagram of a news feed module, in accordance with an embodiment of the invention.

Referring now to FIG. 2, a block diagram 200 of one embodiment of a news tool 136 is shown. The news tool 136 shown by FIG. 2 includes a filtering module 210, a content extraction module 220, a content tagging module 230, a ranking module 240, a viewing filter module 250, and a recommendation module 260. In alternative configurations, different and/or additional components may be included in the news tool 136.

In some embodiments, the news tool 136 receives requests for presentation of news stories from viewing users in the social networking system 130. The filtering module 210 receives a request for news stories and filters news stories retrieved from the news source database 135, from the user profile database 131, from the page database 134, or from any other suitable source, and filters the news stories based on one or more criteria or rules. In one embodiment, the filtering module 210 applies one or more criteria specified in the request to the retrieved news stories. Examples of filters criteria include: a news source, a user, characteristics of the users associated with the news stories (e.g., users connected to the viewing user) a keyword, a topic, content, or any other suitable criteria. The filtering module 210 may also filter news stories based on a combination of factors described herein and/or additional factors.

In one embodiment, the filtering module 210 filters news stories based on the news source. For example, the viewing user requests news stories associated with a specific news source. As another example, the filtering module 210 filters news stories based on news sources in which the user has expressed an interest through the social networking system 130. The filtering module 210 may request information about the interests of the viewing user associated with the user profile stored in the user profile database 131 or analyze actions associated with the user by the action log 133 to identify one or more news sources in which the viewing user has an interest. For example, if the viewing user's user profile includes an interest of "The Wall Street Journal," the filtering module 210 may filter news stories for the viewing user to identify news stories associated with "The Wall Street Journal." As another example, the viewing user's interactions with objects associated with a news source are retrieved and used to determine the viewing user's affinity for the news source; if the viewing user's affinity for the news source is at least a threshold value, the filtering module 210 may identify news stories associated with the news source.

In some embodiments, the filtering module 210 filters news stories based on news sources that are related to or similar to the news sources in which the viewing user has expressed an interest or with which the viewing user has previously interacted. The news source may be selected based on similarity of one or more of the following factors: content, subject matter, reputation, number of subscribers or readers, geographic region of the viewing user or the news source, language, demographic information about the readers, language, and the like. For example, the filtering module 210 may select the "Chicago Tribune" news source based on the user's declared interest in the "Chicago Sun Times" and the similarity in geographic location, readership, reputation, and content between the news sources.

In another embodiment, the filtering module 210 filters news stories to identify news stories associated with users connected to the viewing user. In one embodiment, the viewing user selects a filter to view news stories associated with users connected to the viewing user. In another embodiment, the filtering module 210 selects news stories associated with users that are connected to the viewing user. The filtering module 210 accesses data from the edge store 132 to identify users connected to the viewing user and filters news stories to identify news stories associated with the users connected to the viewing user. In some embodiments, news stories that are liked, shared, or commented on by the users connected to the viewing user are identified by the filtering module 210.

In one embodiment, the filtering module 210 filters news stories based on key words in the content of a news story. The filtering module 210 communicates with the content extraction module 220 to filter news stories based on the key words. The content extraction module 220 identifies and extracts content, such as key words, from an external web page. The extracted content may be used by the filtering module 210 to filter news stories.

The content extraction module 220 retrieves the content from the external web page identified by a link in the news story. The text for the news content presented by the external web page may include various key words, which are identified by the content extraction module 220. In some embodiments, the content extraction module 220 extracts key words from the heading or title of the news content or from the news story itself. In other embodiments, the content extraction module 220 determines key words that are repeated several times in the text of the news content. In another embodiment, the text of the news story or the news content is associated with key words or topics designated by the author or publisher of the story (e.g., key words or topics that are used for searching purposes). These key words may be stored in the source code or otherwise associated with the text of the news story. In one example, a news story describes President Obama's tax plan presented during his presidential campaign for re-election, so the content extraction module 220 extracts the key words "Obama," "taxes," and "presidential campaign" from the news story or from the news content to which the news story links.

To identify key words associated with a news story, the content extraction module 220 may access text on the news content associated with the link in a news story. For example, content extraction module 220 analyzes the title, the headline, and/or frequently used words in the news content to determine key words. The identified key words and associated with the linked news story by the content tagging module 230. For example, the content extraction module 220 may extract and identify key words for tagging from a news story about the Los Angeles Lakers basketball team, such as "Kobe Bryant," "NBA" or "basketball." The filtering module 210 may then use the key words to identify other news stories with similar key words or tags for display to a viewing user based on the identified tags. Inferring and determining key words or topics for content in a social networking system is further described in U.S. patent application Ser. No. 13/589,693, filed on Aug. 20, 2012, which is hereby incorporated by reference in its entirety.

In some embodiments, the content extraction module 220 may determine the key words in the content of the shared links when the user associated with the news story generates or shares the news story. Alternatively, the content extraction module 220 extracts key words from the news content accessible via shared link when a viewing user accesses the link to the external web page. The content extraction module 220 may store the key words or may communicate the key words to the news source database 135 for storage. The filtering module 210 may receive key words associated with a news story and identify additional news stories associated with matching or similar keywords.

In another embodiment, the filtering module 210 filters news stories based on content type, which specifies a category or topic associated with the news stories. Content types may be structured and organized as related categories, such as sub-categories, in the social networking system 130. The content extraction module 220 may identify and extract content types from a news story by analyzing the content of the news story and/or the news content to which it links. For example, a news story about President Obama's tax plan may be associated with the content types for "Politics" or "Tax Reform." In some embodiments, key words are associated with content types, so key words are extracted from a news story and compared to key words associated with categories. The news story may be associated with a content type associated with at least threshold number of key words matching the extracted keywords. For example, the content extraction module 220 may broaden, generalize, or extrapolate extracted key words to content types. Key words identified from a news story about President Obama's tax plan ("Obama," "taxes," and "presidential campaign") may be broadened or extrapolated to the content types for "Politics" or "Tax Reform." The identified content type(s) may be stored in the news source database 135 in association with the news story.

In yet another embodiment, the filtering module 210 filters news stories based on tagged content in the news story. The content tagging module 230 identifies tagged content in a news story. The news source or another entity associated with the link identified by a news story may associate tags with the news content associated with the link, allowing the news source or other entity to identify content in the news content. For example, news content includes metatags for keywords that are related to the content or subject matter of the news content. A metatag (or meta element) is hyper text markup language (HTML) element that provides structured metadata to a web page, allowing specification of page description, key words and any other suitable information. In some embodiments, the metatag includes key words or topics relevant to the news story. For example, if a viewing user accesses a link for a news article about immigration reform, the news article may be tagged with metatags for terms such as "immigrant," "immigration law," and "reform bill." The content tagging module 230 retrieves the tags from the news article and stores the metatags in association with link for the news story, for example, in the news source database 135. When the viewing user requests a display of news stories in the social networking system, the filtering module 210 may identify news stories associated with metatags matching, or related to, metatags specified by the viewing user (e.g., metatags associated with a news story the viewing user previously viewed). For example, a metatag for the "San Francisco Giants" may be related to metatags for "National League," "Buster Posey," "Pablo Sandoval" or "World Series Champions." The filtering module 210 may filters the news stories based on a user's interaction with (viewing of) a metatag associated with a previously-viewed news story or based on metadata otherwise identified by the viewing user (e.g., associated with an element of a third party web page accessed by the viewing user). If a news story is not associated with tags, key words associated with the news story, as further described above, may be compared to specified tags when identifying news stories.

The filtering module 210 may use a combination of one or more of the filtering criteria described above to filter news stories for a viewing user. For example, the filtering module 210 may use any suitable combination of the viewing user's interests, historical data about tags or keywords in viewed news stories, and historical data about a viewing user's interactions with one or more news sources to filter news stories.

In one embodiment, the filtering tool 210 uses a machine learning algorithm to filter and select news stories for a viewing user. The machine learning algorithm may gather data from a user's historical interactions (e.g., sharing, commenting, expressing a preference for, etc.) with the content of news stories, associations with news stories, tagging objects relating to a news source, and any other suitable actions. Based on the information gathered about the user's interests and actions, the filtering module 210 may determine the types and content of news sources and news stories matching the viewing behavior and interests of the viewing user.

The ranking module 240 ranks the news stories for presentation to a viewing user. The ranking process may be separate from or in conjunction with the described filtering methods. For example, filtered news stories may be ranked by the ranking module 240. Alternatively, news stories are not filtered but are ranked for the viewing user. News stories are ranked based on one or more criteria. In one embodiment, the news stories may be ranked chronologically, so the most recent news stories are first presented to a viewing user.

In another embodiment, news stories are ranked based on the viewing user's interests or interactions maintained by the social networking system 130. For example, if a viewing user identifies an interest for "The New York Times" in its user profile, the ranking module 240 may highly rank news stories associated with The New York Times so they are first presented to the viewing user. If a viewing user has previously viewed at least a threshold number of news stories associated with a news source or has a threshold affinity for the news source, then the ranking module 240 may highly rank news stories associated with the news source. In another example, if a viewing user has previously viewed a threshold number of news stories associated with a particular news topic or has viewed news stories associated with the particular news topic within a threshold time of a current time, then the ranking module 240 may determine that the viewing user has an interest in certain topics news stories and provide news stories associated with similar news topics with higher ranking scores.

In other embodiments, the ranking module 240 ranks news stories based on the affinity of the viewing user for users associated with the news stories. For example, the news stories may be ranked so news stories associated with users for which the viewing user has higher affinities have higher positions in the ranking. In other embodiments, the ranking module 240 may rank news stories so that news stories associated with users having similar interests to the viewing user (e.g., users having at least a threshold number of interests matching or related to the viewing user's interests) are ranked higher. Alternatively, news stories may be ranked based on the popularity of the links included in the news stories. Popularity of a link may be based on a number of views or click-throughs on the link, a number of news stories including the link, a number of users expressing a preference for the link ("liking" the link), a number of users sharing the link, a total number of comments about the link by other users, a numbers of accesses to metatags associated with the link, or a combination of these indicators.

The ranking module 240 may apply a scoring process to assign scores and weights to news stories and rank the news stories based on the scores. In one embodiment, the scores indicate how strongly news stories are associated with or match one or more ranking criteria. For example, the ranking module 240 may associates high scores with news stories generated or received by the social networking system 130 within a threshold time from a current time. As the news stories become older, their associated scores may be lowered. In another example, higher ranking scores may be given to news stories having keywords, categories, or tags that match, or are related to, interests of the viewing user or actions previously performed by the viewing user and logged by the social networking system 130. If a user has liked "Bon Appétit Magazine" and commented on shared links associated with other food-related web pages, the ranking module 240 may assign higher scores for news stories associated with "Bon Appétit" or other food-related news sources.

Furthermore, if a news story is associated with a large number of likes, comments or shares, the news story may be given a high ranking score. Similarly, if a link in a news story has more than a threshold number of click-throughs, likes, comments, or shares in the social networking system 130, the news story including the link may be categorized as a trending or popular news story and provided with an increased score. The most popular news stories may be ranked highly and displayed to a viewing user as a "trending article" or "most viewed."

The viewing filter module 250 receives viewing filter criteria from the viewing user to modify the news stories presented to the viewing user via a news feed page or a separate news story page. An interface element, such as a pull-down menu, a button, a text box, or selection box, may be presented to allow the viewing user to specify viewing filter criteria. In one embodiment, the viewing user does not provide filter criteria, so all of the news stories associated with users connected to the viewing user and not connected to the viewing user are presented. Various viewing filter criteria may be specified by the viewing user to modify the news stories presented to the viewing user. For example, presented news stories may be filtered based on popularity, allowing the news stories to be presented in descending or ascending order of popularity. As another example, presented news stories may be filtered based on times associated with the presented news stories, allowing the presented news stories to be presented in chronological or in reverse chronological order based on a creation time or a time of a most recent interaction with the news story.

Viewing filter criteria may specify a news source to limit the presented news stories to news stories associated with a specified news source. Accordingly, a viewing user specifying viewing filter criteria identifying "The San Francisco Chronicle" is presented with news stories associated with "The San Francisco Chronicle" and not news stories associated with other news sources. Viewing filter criteria may also limit the presented news stories to news stories associated with a specified user or associated with users having a specified type of connection to the viewing user. A news story may be associated with a user because the user generated the news story, expressed a preference for the news story, shared the news story with additional users, commented on the news story, or otherwise interacted with the news story. Various combinations of the preceding viewing filter criteria and/or other viewing filter criteria may be applied to the presented news stories.

The recommendation tool 260 recommends news stories or news sources to a viewing user based on data about the user retrieved from the user profile database 131, edge store 132, and/or action log 133. From the retrieved data about the user, the recommendation tool 260 identifies interests declared by the viewing user or inferred for the viewing user from actions by the viewing user. Actions that may be used to infer interests of the viewing user include accesses of news stories, accesses of news content presented by a news source, comments about news stories, sharing news stories, expressions of preference for news stories, or other suitable interactions. Based on the viewing user's interests and actions, the recommendation tool 260 recommends additional news sources to the viewing user. The additional news sources may have a threshold number of characteristics matching, or similar to, characteristics of news sources for which the viewing user has a preference. Examples of characteristics of news sources include: on content, subject matter, number of subscribers or readers, geographic region, language, demographic information about the readers, language, and the like. In one example, a viewing user may have expressed interest in sports websites in the social networking system 130, so the recommendation tool 260 recommends additional sports-related news sources for the viewing user. Alternatively, the recommendation tool 260 may select additional news stories for a viewing user that have similar content, keywords, or topics to as news stories presented to the viewing user.

In some embodiments, the recommendation tool 260 presents one or more additional news source to the viewing user as a question or message in a separate interface of the social networking system 130. The recommendation tool 260 may send the recommendation using any suitable communication channel, such as a notification message, a text message, or another suitable communication medium in the social networking system 130. If the viewing user accepts a recommended news source, a user profile of the viewing user is updated to include the recommended news source. In other embodiments, the user may express interest in the recommended news source by liking the news source page, or the recommendation tool 260 may automatically add the recommended news source to the viewing user's user profile.

Figure 3:
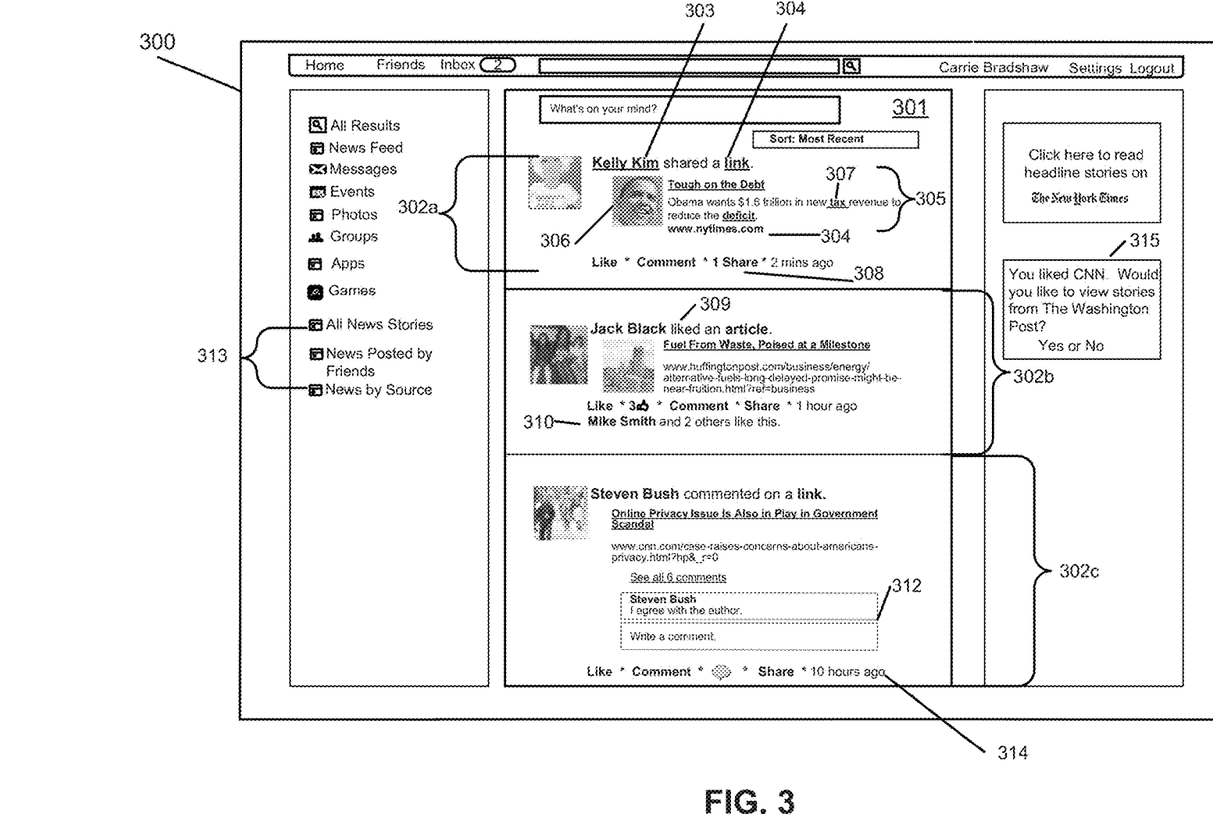
FIG. 3 is an example of a news feed page displaying news stories in the social networking system, in accordance with an embodiment of the invention.

FIG. 3 shows an example of a news feed page 300 presented by the social networking system 130 displaying news. In other embodiments, the news stories are displayed on a separate news story page including news stories without other types of content. As shown in FIG. 3, the news feed page 300 includes a news feed 301 presenting a plurality of news stories 302a, 302b, 302c associated with other users connected to a viewing user ("Carrie Bradshaw") of the social networking system 130. The news story 302a identifies a user 303 connected to the viewing user sharing a link to news content with the viewing user. As shown in FIG. 3, the news story 302a displays an image associated with the user 303 and a link to access a user profile associated with the user 303.

The news story 302a includes a link 304 to news content presented by a news source external to the social networking system 130. In the example of FIG. 3, the news story 302a also includes a description 305 of the news content and an image 306 associated with the news content. The description 305 may include a title and a short summary about the content of the news content. The description 305 may also identify metatags 307 or key words associated with the news content; the metatags 307 or key words may be links for accessing other web pages describing the metatags or key words maintained by one or more news sources external to the social networking system 130. The news story 302a may also identify interactions between users and the news story 302a. As shown in news story 302b, identifiers 310 of users connected to the viewing user that previously interacted with the news story 302b may be presented. Comments 312 from users on a news story may be displayed in the news story, as shown in news story Filter criteria 313 may be presented by the news feed page 300, allowing the viewing user to modify the displayed news stories 302a, 302b, 302c. For example, selecting an "All News Stories" filter criteria 313 displays news stories within a threshold time from the current time associated with users connected to the viewing user and users not connected to the viewing user. In one embodiment, news stories associated with users not associated with the viewing user are displayed in an order based on the popularity of the news stories, the popularity of the topics associated with the news stories, or based on any other suitable attribute. Selecting a "News Posted by Friends" filter criteria 313 limits the displayed news stories 302a, 302b, 302c to those associated with users connected to the viewing user, as shown by the news feed 301. Selecting a "News by Source" filter, which filters news stories to limit presentation of news stories to those associated with a selected news source.

In the example of FIG. 3, the news stories 302a, 302b, 302c are displayed in chronological order based on the date and time that the news stories 302a, 302b, 302c were generated or received. For example, the posts displayed at the top of the news feed 301 were generated more recently (e.g., 2 minutes ago) than posts lower in the news feed 301.

A recommendation box 315 may be displayed via the news feed page 300. The recommendation box 315 includes a recommendation for an additional news source for the viewing user. In this example, the recommendation box 315 provides a question prompting the viewing user to associate an additional news source with the viewing user's user profile. Accepting the presented additional news source adds the additional news source to the viewing user's user profile.

Figure 4:
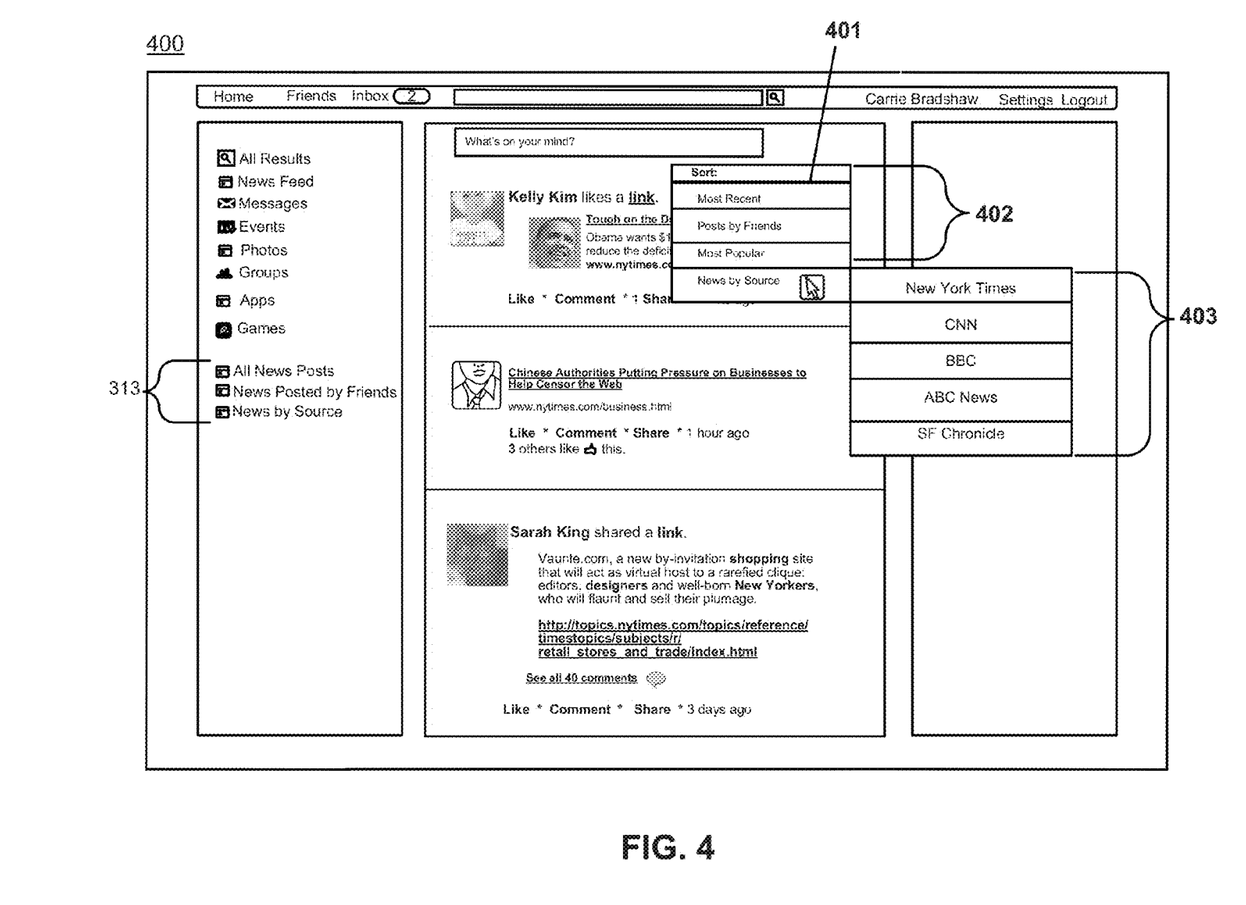
FIG. 4 is another example of a news feed page displaying news stories in the social networking system, in accordance with an embodiment of the invention.

FIG. 4 is another example of a news feed page 400 displaying news stories via the social networking system 130. In the example of FIG. 4, a pull down menu 401 including various view filtering criteria is presented to the viewing user. The pull-down menu 401 includes various options for types of filtering options 402, and selecting a type of filtering option 402 presents an additional pull-down menu 403 for specifying a value for the selected type of filtering option 402. In FIG. 4, the viewing user selects a type of filtering option 402 to filter the news stories by news source, prompting the viewing user to select a news source from the additional pull-down menu 403

Figure 5:
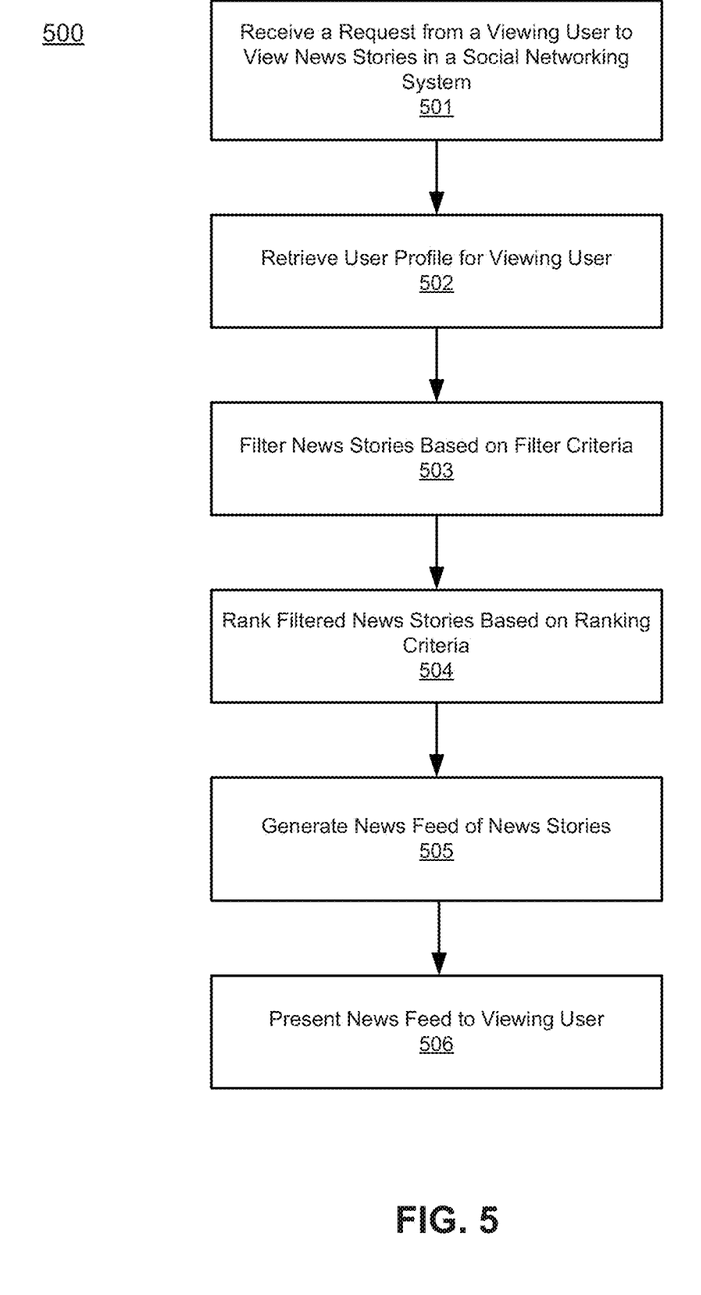
FIG. 5 is a flow chart of a method for filtering and ranking news stories presented by a social networking system, in accordance with an embodiment of the invention.

FIG. 5 illustrates a flow chart of one embodiment of a method 500 of filtering and ranking news stories for presentation to a viewing user of a social networking system 130. Initially, the social networking system 130 receives 501 a request from the viewing user to view news stories, and the social networking system 130 retrieves 502 a user profile associated with the viewing user from the user profile database 131. The user profile information describes the viewing user's interests (e.g., preferred news sources, news source pages in which the viewing user has expressed an interest, etc.). Based on information in the edge store 132 users connected to the viewing user are also identified.

News stories stored by the social networking system 130 are retrieved and filtered 503 by the filtering module 210 based on one or more filter criteria, as further described above. Each news story is associated with a user of the social networking system and includes a link to news content maintained by a news source external to the social networking system 130. For example, the news stories are filtered 503 to identify news stories associated with users connected to the viewing user or to identify news stories associated with a specified news source. As other examples, the news stories may also be filtered 503 by one or more key words, content types, or tags associated specified by the viewing user or associated with a news story with which the viewing user has previously interacted, as described above in conjunction with FIG. 2

The filtered news stories are ranked 504 by the ranking module 240 based on one or more ranking criteria. In some embodiments, the filtered news stories are ranked 504 based on popularity of the news stories or based on time and date information associated with the filtered news stories. Alternatively, the news stories are ranked 504 based on retrieved data about the user's interests or historical interactions logged in the social networking system 130, such as data describing about viewing user's interest in various topics, users, news sources, or other suitable information.

The social networking system 130 generates 505 a news feed of the filtered news stories. In one embodiment the news stories are ordered in the generated news feed based at least in part on the ranking. The generated news feed of the news stories may be presented 506 to the viewing user via a news feed, via a separate news story page, or via any other suitable communication channel.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    storing, in a social networking system, a plurality of news stories each generated by a user of the social networking system and including a link to news content published on web pages maintained by a news source external to the social networking system;
    storing, in the social networking system, a social graph that identifies relationships between different users of the social networking system;
    receiving a request from a viewing user of the social networking system for news stories, the request specifying a filter criteria;
    selecting a filtered set of news stories from the plurality of news stories, wherein each news story of the filtered set satisfies the filter criteria;
    determining user information associated with the viewing user by the social networking system, the user information including data identifying users connected to the viewing user via the social networking system;
    selecting a first subset and a second subset from the filtered set of news stories, wherein news stories of the first subset are associated with users connected to the viewing user and news stories from the second subset are associated with users not connected to the viewing user;
    ranking the filtered set of news stories such that the first subset of news stories is ranked using a first ranking criteria and the second subset of news stories is ranked using a second ranking criteria;
    configuring a user interface for presenting the filtered set of news stories based on the ranking; and
    sending the user interface for presentation to the viewing user.

2. The method of claim 1, wherein the first ranking criteria comprises affinities between the viewing user and users associated with each of the selected news stories, and the second ranking criteria comprises a popularity of the selected news stories based on previous interactions between users of the social networking system and each of the selected news stories.

3. The method of claim 2, wherein the previous interactions between users of the social networking system and a selected news story are selected from a group comprising: a user sharing the selected news story, expressing a preference for the selected news story, providing a comment associated with the selected news story, or any combination thereof.

4. The method of claim 2, wherein the second ranking criteria comprises a popularity of the selected news stories based on previous interactions between users of the social networking system and each of the selected news stories.

5. The method of claim 2, wherein the second ranking criteria is based on one or more of: the number of views of the selected news story by users of the social networking system, a number of news stories including a link to the selected news story, a number of accesses to metatags associated with the link to the selected news story.

6. The method of claim 1, wherein the first or the second ranking criteria comprise a similarity between interests of a user associated with a selected news story and interests of the viewing user.

7. The method of claim 6, wherein a similarity between interests of the user associated with the selected news story and interests of the viewing user comprises a common news source.

8. The method of claim 6, wherein a similarity between interests of the user that generated the selected news story and interests of the viewing user comprises a common news topic.

9. The method of claim 1, wherein the first or the second ranking criteria is based on one or more of: interests of the viewing user, actions of the viewing user, and any combination thereof.

10. The method of claim 1, wherein the first ranking criteria comprises affinities between the viewing user and users that generated each of the selected news stories.

11. The method of claim 1, further comprising:
identifying an additional news source for the viewing user based on one or more of interests of the viewing user and actions of the viewing user; and
presenting a recommendation of the additional news source to the viewing user.

12. The method of claim 1, wherein at least one news source maintains a news source page in the social networking system.

13. The method of claim 12, wherein ranking the selected news stories comprises:
determining that at least one of the selected news stories includes a link to a webpage maintained by the at least one news source; and
ranking the at least one of the selected news stories based on a level of interaction by the viewing user or the users connected to the viewing user with the news source page.

14. The method of claim 1, wherein the filter criteria comprises a user of the social networking system.

15. The method of claim 1, wherein the filter criteria comprises interests of the viewing user.

16. The method of claim 1, wherein selecting a filtered set of news stories comprises filtering based on a viewing user's affinity for a news source.

17. The method of claim 1, wherein selecting a filtered set of news stories comprises filtering based on a news source that is similar to other news sources that the viewing user has expressed interest in, wherein the similarity is based on demographic information about readers of news from the news sources.

18. The method of claim 1, wherein selecting a filtered set of news stories comprises filtering based on one or more key words describing content of news content published on web pages maintained by a news source external to the social networking system.

19. A method comprising:
storing, in a social networking system, a plurality of news stories each generated by a user of the social networking system and including a link to news content published on web pages maintained by a news source external to the social networking system;
receiving a request from a viewing user of the social networking system for news stories, the request specifying a filter criteria;
selecting a filtered set of news stories from the plurality of news stories, wherein each news story of the filtered set satisfies the filter criteria;
determining user information associated with the viewing user by the social networking system, the user information including data identifying users connected to the viewing user via a social graph that identifies relationships between different users of the social networking system;
selecting news stories from the filtered set of news stories generated by users within the social networking system;
ranking the selected news stories such that stories generated by users connected to the viewing user are ranked using a first ranking criteria and remaining stories are ranked using a second ranking criteria;
generating a list including the selected news stories in an order based at least in part on the ranking; and
displaying the generated list of news stories to the viewing user.

20. The method of claim 19, wherein the first ranking criteria is used if the selected news stories are generated by users connected to the viewing user, and the first ranking criteria comprises affinities between the viewing user and users that generated each of the selected news stories.

21. The method of claim 20, wherein the second ranking criteria is based on one or more of: the number of views of the selected news story by users of the social networking system, a number of news stories including a link to the selected news story, and a number of accesses to metatags associated with the link to the selected news story.

22. The method of claim 20, wherein the second ranking criteria is used if the selected news stories are generated by users that are not connected to the viewing user, wherein the second ranking criteria comprises a popularity of the selected news stories based on previous interactions between users of the social networking system and each of the selected news stories.

23. The method of claim 22, wherein the previous interactions between users of the social networking system and a selected news story are selected from a group comprising: a user sharing the selected news story, expressing a preference for the selected news story, providing a comment associated with the selected news story, or any combination thereof.

24. The method of claim 19, further comprising:
identifying an additional news source for the viewing user based on one or more of interests of the viewing user and actions of the viewing user; and
presenting a recommendation of the additional news source to the viewing user.

25. The method of claim 19, wherein at least one news source maintains a news source page in the social networking system.

26. The method of claim 25, wherein ranking the selected news stories comprises:
determining that at least one of the selected news stories includes a link to a webpage maintained by the at least one news source; and
ranking the at least one of the selected news stories based on a level of interaction by the viewing user or the users connected to the viewing user with the news source page.

27. The method of claim 19, wherein the filter criteria comprises a user of the social networking system.

28. The method of claim 19, wherein the filter criteria comprises interests of the viewing user.

29. The method of claim 19, wherein selecting a filtered set of news stories comprises filtering based on a viewing user's affinity for a news source.

30. The method of claim 19, wherein selecting a filtered set of news stories comprises filtering based on a news source that is similar to other news sources that the viewing user has expressed interest in, wherein the similarity is based on demographic information about the readers of news from the news sources.

31. The method of claim 19, wherein selecting a filtered set of news stories comprises filtering based on one or more key words describing content of news content published on web pages maintained by a news source external to the social networking system.

* * * * *

UNITED STATES PATENT AND TRADEMARK OFFICE
CERTIFICATE OF CORRECTION

PATENT NO. : 10,037,538 B2  
APPLICATION NO. : 13/711262  
DATED : July 31, 2018  
INVENTOR(S) : Adrian A. Graham

Page 1 of 1

It is certified that error appears in the above-identified patent and that said Letters Patent is hereby corrected as shown below:

In the Claims

Column 18, Line 55, after "more of:" delete "the" and insert -- a --.
Column 20, Line 18, after "more of:" delete "the" and insert -- a --.
Column 20, Line 66, after "about" delete "the".

Signed and Sealed this
Twenty-third Day of April, 2019

Andrei Iancu
*Director of the United States Patent and Trademark Office*